Nov. 11, 1941.    A. MOORE    2,262,032

TAPE CONTROLLING ARRANGEMENT

Original Filed April 3, 1936

INVENTOR
Alexander Moore
BY
ATTORNEYS

Patented Nov. 11, 1941

2,262,032

UNITED STATES PATENT OFFICE 2,262,032

TAPE CONTROLLING ARRANGEMENT

Alexander Moore, Bournemouth, Hants, England, assignor to Trans-Lux Corporation, a corporation of Delaware Application April 3, 1936, Serial No. 72,594
Renewed January 19, 1940

6 Claims. (Cl. 271—2.3)

My invention relates to an arrangement for controlling a tape for movement through a projection field.

My invention has particular reference to an arrangement which is disposed at or adjacent the entrance to a projection field so as to be slidingly engaged by the tape in such manner that vibration or "jump" of the tape section in the projection field at any given time is largely or substantially prevented.

Various other objects, advantages and characteristics of my invention will become apparent from the following description.

My invention resides in the tape-controlling arrangement, features, and combinations of the character hereinafter described and claimed.

For an understanding of my invention and for an illustration of one of the forms thereof, reference is to be had to the accompanying drawing, in which.

Figure 1:
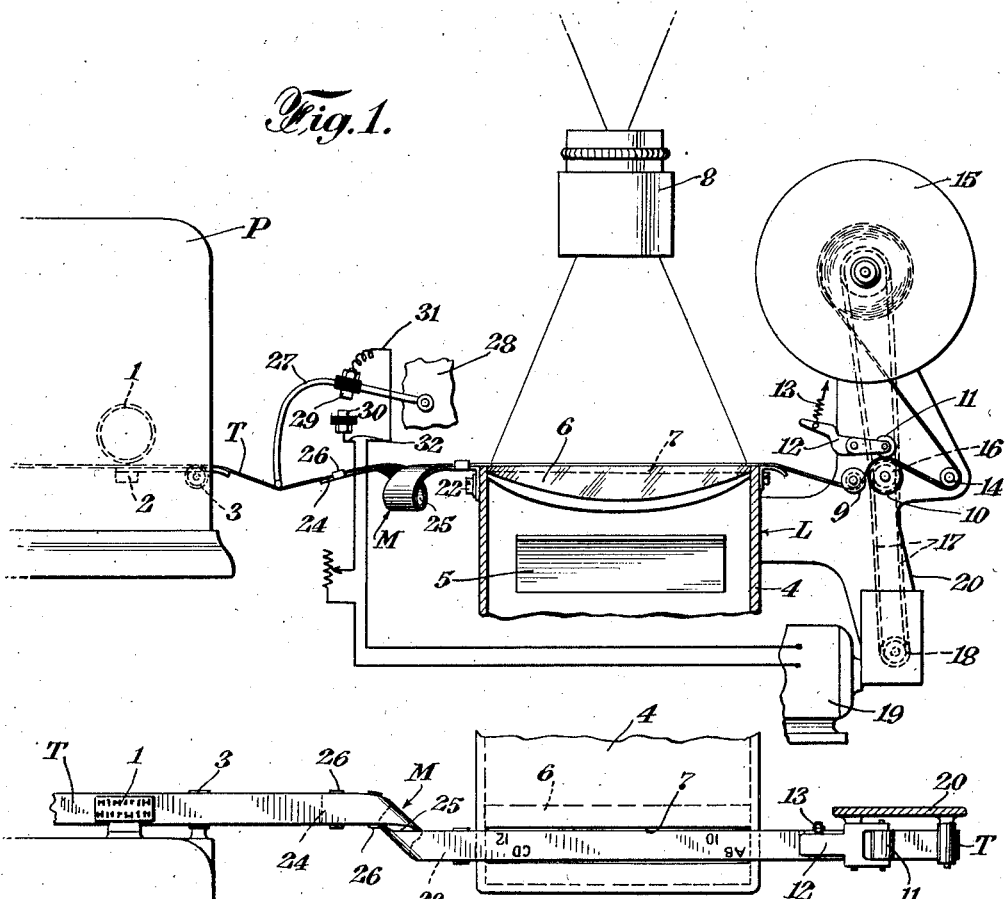
Figure 1 is a front elevational view of a tape-controlling arrangement embodying my invention.
Figure 2:
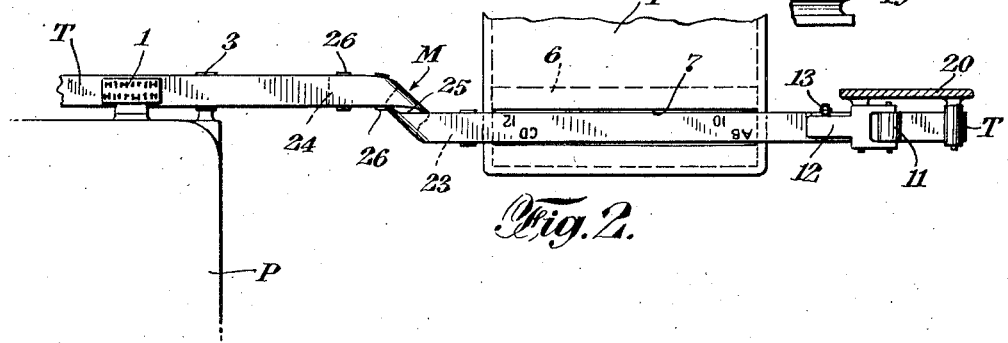
Fig. 2 is a plan view, with parts omitted, of the arrangement shown in Fig. 1.
Figure 3:
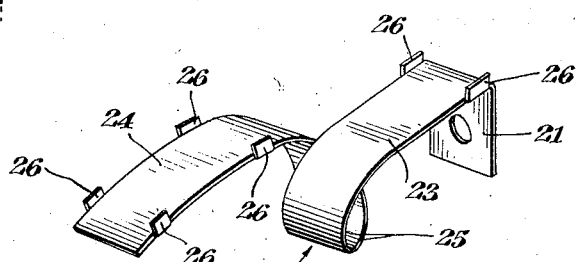
Fig. 3 is a perspective view of the novel device of my invention.

Referring to Figs. 1 and 2, P represents any suitable printing device such, for example, as a stock ticker mechanism which comprises the usual printing wheel 1 and platen 2 utilizable for printing characters lengthwise on a narrow tape T adapted to engage a guide roller 3 as it is ejected from said ticker mechanism.

Disposed adjacent the printing device P is a projector L which may be of suitable character as well understood in the art. As herein generally shown, although not necessarily, the projector L comprises a lamp and lens housing 4 which encloses a lamp, not shown, from which a projecting light beam is directed in a horizontal direction so as to engage a mirror 5. The latter changes the course of said light beam so that it travels in a vertical direction upward through a condensing lens 6 and then through a slot 7 formed in the top wall surface of the housing 4, the slot 7 defining the projection field of said projector L. After passing through the slot 7 and the tape section defined thereby, the projecting light beam passes upwardly through an objective lens 8 and then comes into engagement with any suitable mirror system, not shown, by which said light beam is caused to engage the projector screen.

With a projection system of the character described, it will be understood that the tape T is necessarily of the type adapted for "through" projection. However, it shall be understood that my invention is not limited in this respect because, as well, my invention is applicable to "reflecting" projection such as obtains when using an opaque tape.

The tape T may be pulled or drawn through the projection field defined by the slot 7 in any suitable manner. Thus, for example and as shown in Fig. 1, said tape T may be passed beneath a roll 9, or equivalent, which is positioned at or below the horizontal plane of the slot 7. Thereafter, the tape T passes over a pulling roll 10 with which the tape is held in engagement by an idler roll 11 mounted on a lever 12 which is biased in a clockwise direction, Fig. 1, by a spring 13 or the like. As shown, the tape T, after passage thereof beyond the pulling roll 10, engages an idler roll 14, or equivalent, and then passes upwardly to a suitable reel 15.

The pulling roll 10 may be operated in any suitable manner such, for example, as shown in Fig. 1 wherein the operating shaft for said pulling roll 10 carries a suitable pinion 16 with which engages an endless sprocket chain 17, or equivalent, this chain being operated by a pinion 18 which is rotatable at suitable speed by an electric motor 19.

As herein shown, although not necessarily, the above described rolls 9, 10, 11, 14, the reel 15 and associated parts may be carried by a supporting bracket 20 which, if desired, may be secured to and carried by the aforesaid lamp and lens housing 4.

The reel 15 serves in the usual manner as a member upon which the tape T is wound after passage thereof beyond the pulling roll 10. This reel 15 may be operated in any suitable manner such, for example, as by an endless spring belt, not shown, which is engaged by pulleys carried, respectively, by the shaft of said reel 15 and the common shaft for the roll 10 and pinion 16. Therefore, as will readily be understood by those skilled in the art, the motor 19 furnishes power for operating the reel 15.

In accordance with the invention, there is disposed at the entrance to the projection field a snubbing arrangement structure, or member M utilizable for largely preventing the passage into the projection field of vibrations such as those set up in the tape by the feeding mechanism of the printing device P.

As herein shown, the structure M comprises a flanged section 21 by which it may be secured, by a screw 22, or equivalent, to the side wall of the housing 4 at the entrance to the projection field defined by the slot 7. As clearly illustrated in Fig. 2, the structure M comprises a first section 23 disposed in alinement with said projection field and pointing toward the same, and said structure M further comprises a second section 24 offset from the first section, disposed in alinement with the path of the tape as it issues from the printing device P and pointing toward said printing device, these two sections being joined together by the spiral-like section 25. As illustrated, the spiral-like section 25 comprises tape-engaging curved surfaces facing approximately in opposite directions and, more specifically, approximately toward and from the projection field. With the arrangement described, the distance between these tape-engaging curved surfaces remains fixed. Preferably, the structure M is formed from non-yielding sheet metal, or equivalent, and, in accordance with preferred practice, the upper surfaces of said sections 23 and 24 should be provided with the tape guides 26. Accordingly, as clearly appears from the drawing, the tape T extends from the printing device P into engagement with the section 24 of the structure M from which the tape extends around the spiral-like section 25, along the section 23, across the projection field and then into engagement with the pulling roll 10. Further, as will be obvious, the guides 26 serve to maintain the tape in its intended course as it passes along the structure M, such guides, in a preferred manner, preventing lateral movement of the tape with respect to the sections 23, 24 and 25.

It is well known in the art that the ticker tape T is ejected in an irregular, intermittent manner from the printing device P and it follows, therefore, that the pulling roll 10 may not operate continuously to draw the tape across the projection field. Accordingly, for purposes of control, I have shown a lever 27 which engages the tape and forms a loop therein, such lever being pivoted on a suitable support 28. The lever 27 carries an electrical contact 29 which is coactable with a fixed contact 30, these contacts having connected thereto the respective conductors 31 and 32 which lead to the aforesaid motor 19.

With the parts positioned as shown in Fig. 1, the contacts 29 and 30 are open and, therefore, the motor 19 does not operate to draw tape through the projection field. However, as will be understood, when operation of the printing device P is initiated, the tape loop lengthens to thereby permit movement of the lever 27 in a counterclockwise direction, Fig. 1, whereby the circuit of the motor 19 is closed at the contacts 29, 30. When this occurs, the pulling roll 10 is rotated to draw the tape through the projection field and this drawing operation occurs as long as the aforesaid contacts remain closed.

As well understood in the art, the tape T is ejected from the printing device P in a pulsating manner. Is is principally for this reason that vibrations or "jump" are set up in the tape and, if such vibrations were transmitted into the projection field, the resulting magnification in the optical system would render observation of the projected images objectionable.

In order to prevent the transmission of such type vibrations into the projection field, I utilize a structure M of the character hereinbefore described. When this structure is used in a system as illustrated, the tape remains more or less in binding relation with respect to the path defined by the sections 24, 25 and 23 of said structure M. The latter, therefore, acts generally as a snubber and because the tape, to some extent at least, is in binding engagement therewith, it follows that vibrations or "jump" set up in the tape by the printing device P are largely absorbed or prevented from entering the projection field.

The action described above is rendered particularly effective by reason of the lateral separation of the sections 24, 23 of said structure M. Due to the presence of the set of guides 26 on these respective sections, it results that adjacent sections of the tape are maintained in lateral spaced relation as shown in Fig. 2. Therefore, the desired binding action of the tape on the structure M is rendered more effective for the purpose desired.

It will be understood that the invention is not to be limited to the use of a lever for control purposes as described. As well, for the purpose of controlling the motor 19, there may be utilized a suction control mechanism as generally described in U. S. Letters Patent Re. No. 19,670. Further, under some circumstances, the control arrangements as just described may be eliminated and the motor 19 connected to the pulling roll 10 by a slip clutch so that, when the tape becomes taut between the printing device P and the projector L, said pulling roll 10 remains stationary during continuous operation of the motor 19.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. Means for largely preventing passage into a projection field of vibrations produced in a tape by a device which prints characters on the upper face of said tape and from which said tape is ejected horizontally and flatwise prior to passage thereof through said projection field, said means comprising a structure disposed adjacent the entrance to said projection field and said tape being wound around said structure in single loop formation, said structure being constructed and arranged so that a spiral configuration is imparted to the tape section wound therearound.

2. Means for largely preventing passage into a projection field of vibrations produced in a tape by a device which prints characters on the upper face of said tape and from which said tape is ejected horizontally and flatwise prior to passage thereof through said projection field, said means comprising a spiral-like structure having sections extending, respectively, in opposite directions toward the printing device and toward said projection field, said structure being disposed adjacent the entrance to said projection field and said tape being wound around said structure in single loop formation.

3. Means for largely preventing passage into a projection field of vibrations produced in a tape by a device which prints characters on the upper face of said tape and from which said tape is ejected horizontally and flatwise prior to passage thereof through said projection field, said means comprising a spiral-like structure having sections extending, respectively, in opposite directions toward the printing device and toward said projection field, said structure being disposed adjacent the entrance to said projection field and said tape being wound around said structure in single loop formation, said sections being displaced laterally with respect to each other by a spiral section of said structure.

4. Means for largely preventing passage into a projection field of vibrations produced in a tape by a device which prints characters on the upper face of said tape and from which said tape is ejected horizontally and flatwise prior to passage thereof through said projection field, said means comprising a spiral-like structure having sections extending, respectively, in opposite directions toward the printing device and toward said projection field, said structure being disposed adjacent the entrance to said projection field and said tape being looped around said structure, and means for causing the tape to hug said spiral-like structure, said last-named means comprising a member disposed between said printing device and said projection field, said member being utilizable for controlling movement of said tape through said projection field.

5. Means for largely preventing passage into a projection field of vibrations produced in a tape by a device which prints characters on the upper face of said tape and from which said tape is ejected horizontally and flatwise prior to horizontal passage thereof through said projection field, said means comprising a structure disposed between said projection field and the printing device, said structure having one tape-engaging curved surface facing in one direction and another tape-engaging curved surface facing in the opposite direction or approximately so, said tape-engaging curved surfaces being positioned in such relation to each other that the tape is caused to form a pair of oppositely extending curved sections, said structure being of such character that the distance between said curved tape-engaging surfaces remains fixed, means for supporting said structure in fixed position whereby the curved surface area thereof engaged by said tape remains substantially constant, and means at the exit end of said projection field for drawing said tape therethrough.

6. Means for largely preventing passage into a projection field of vibrations produced in a tape by a device which prints characters on the upper face of said tape and from which said tape is ejected horizontally and flatwise prior to horizontal passage thereof through said projection field, said means comprising a structure disposed between said projection field and the printing device, said structure having one tape-engaging curved surface facing toward the projection field approximately and another tape-engaging curved surface facing from the projection field approximately, said tape-engaging curved surfaces being positioned in such relation to each other that the tape is caused to form a pair of oppositely extending curved sections, said structure being of such character that the distance between said curved tape-engaging surfaces remains fixed, means for supporting said structure in fixed position whereby the curved surface area thereof engaged by said tape remains substantially constant, and means at the exit end of said projection field for drawing said tape therethrough.

ALEXANDER MOORE.